United States Patent
Gao et al.

(10) Patent No.: US 9,125,071 B2
(45) Date of Patent: Sep. 1, 2015

(54) METHOD, SYSTEM AND APPARATUS FOR MEASURING INTERFERENCE

(75) Inventors: Qiubin Gao, Beijing (CN); Xin Su, Beijing (CN)

(73) Assignee: China Academy of Telecommunications Technology, Beijing (CN)

(*) Notice: Subject to any disclaimer, the term of this patent is extended or adjusted under 35 U.S.C. 154(b) by 121 days.

(21) Appl. No.: 13/700,983

(22) PCT Filed: Sep. 9, 2011

(86) PCT No.: PCT/CN2011/079518
§ 371 (c)(1),
(2), (4) Date: Nov. 29, 2012

(87) PCT Pub. No.: WO2012/031565
PCT Pub. Date: Mar. 15, 2012

(65) Prior Publication Data
US 2013/0070634 A1    Mar. 21, 2013

(30) Foreign Application Priority Data
Sep. 10, 2010 (CN) .......................... 2010 1 0280130

(51) Int. Cl.
*H04B 17/345* (2015.01)
*H04W 24/00* (2009.01)
*H04W 24/10* (2009.01)

(52) U.S. Cl.
CPC ............. *H04W 24/00* (2013.01); *H04B 17/345* (2015.01); *H04W 24/10* (2013.01)

(58) Field of Classification Search
USPC ....................... 370/310.2, 317, 328–339, 349; 455/63.1, 67.13, 114.2, 278.1, 296, 455/422.1, 501
See application file for complete search history.

(56) References Cited

U.S. PATENT DOCUMENTS

2009/0268630 A1* 10/2009 Yellin et al. .................... 370/252
2011/0105144 A1* 5/2011 Siomina et al. ............ 455/456.1
(Continued)

FOREIGN PATENT DOCUMENTS

CN    101090552 A    12/2007
CN    101626255 A    1/2010
(Continued)

OTHER PUBLICATIONS

Zte, 3GPP TSG RAN WG1 Meeting #61bis, Investigation on CSI-RS Muting, Jun. 28, 2010-Jul. 2, 2010, 8 pages.*
(Continued)

*Primary Examiner* — Hoon J Chung
(74) *Attorney, Agent, or Firm* — Gilberto M. Villacorta; Kelly Zeng; Foley & Lardner LLP

(57) ABSTRACT

The invention relates to the technical field of wireless communications, and in particular to a method, system, and device for measuring interference, so as to solve the problem in the prior art that the precision of interference measured by a terminal is low if a cell adopts a Resource Element Muting (RE MUTING) solution. The method includes: a network side device determining configuration information of a first Resource Element(RE) group performing interference measurement (501); and the network side device generating first interference notification information according to the determined configuration information of the first RE group and sending the first interference notification information to a terminal, so as to instruct the terminal to determine the first RE group according to the first interference notification information and perform the interference measurement on the determined first RE group (502). The terminal is notified to perform the interference measurement on the first RE group, so that when the RE MUTING solution is adopted, the precision of the measured interference is increased.

19 Claims, 7 Drawing Sheets

(56) References Cited

U.S. PATENT DOCUMENTS

| | | | |
|---|---|---|---|
| 2011/0230144 A1* | 9/2011 | Siomina et al. | 455/68 |
| 2011/0235743 A1* | 9/2011 | Lee et al. | 375/295 |
| 2011/0244877 A1* | 10/2011 | Farajidana et al. | 455/452.2 |
| 2011/0317657 A1* | 12/2011 | Chmiel et al. | 370/331 |
| 2012/0046030 A1* | 2/2012 | Siomina et al. | 455/423 |
| 2012/0106374 A1* | 5/2012 | Gaal et al. | 370/252 |
| 2012/0120846 A1* | 5/2012 | Hwang et al. | 370/254 |
| 2012/0155291 A1* | 6/2012 | Koivisto et al. | 370/252 |
| 2012/0207043 A1* | 8/2012 | Geirhofer et al. | 370/252 |
| 2012/0220327 A1* | 8/2012 | Lee et al. | 455/509 |
| 2012/0257515 A1* | 10/2012 | Hugl et al. | 370/252 |
| 2012/0264441 A1* | 10/2012 | Chandrasekhar et al. | 455/450 |
| 2012/0315859 A1* | 12/2012 | Lee et al. | 455/67.13 |
| 2013/0044727 A1* | 2/2013 | Nory et al. | 370/330 |
| 2013/0070634 A1* | 3/2013 | Gao et al. | 370/252 |
| 2013/0077518 A1* | 3/2013 | Abe et al. | 370/252 |

FOREIGN PATENT DOCUMENTS

| | | | |
|---|---|---|---|
| WO | WO 2009/108011 | 9/2009 | |
| WO | WO 2009/110756 | 9/2009 | |
| WO | WO 2011/129734 A1 * | 10/2011 | H04L 27/26 |

OTHER PUBLICATIONS

International Search Report for PCT/CN2011/079518—mailed Dec. 22, 2011.
Written Opinion of the International Searching Authority for PCT/CN2011/079518—mailed Dec. 22, 2011.
3GPP TSG-RAN WG1 Meeting #62 (R1-104797), Signaling and Configuration of CSI-RS, Aug. 23-27, 2010, 7 pgs.

* cited by examiner

METHOD, SYSTEM AND APPARATUS FOR MEASURING INTERFERENCE

The present application is a US National Stage of International Application No. PCT/CN2011/079518, filed 9 Sep. 2011, designating the United States, and claiming priority to Chinese Patent Application No. 201010280130.7 filed 10 Sep. 2010.

FIELD OF THE INVENTION

The present invention relates to the field of wireless communications and particularly to a method, system and apparatus for measuring interference.

BACKGROUND OF THE INVENTION

Each cell in a wireless cellular network system is typically provided with a base station communicating with a user equipment. Before a data transmission process is started, the base station will transmit reference signals (i.e., pilot signals) to the user equipment, and the user equipment can obtain a value of channel estimation from the reference signals. The reference signals are a known sequence of signals transmitted at a specific prescribed time at a specific prescribed frequency. The quality of channel estimation will be influenced by interference, noise and other factors.

Typically the user equipment is located at different geographical locations with different received signal strengths and different noise and interference strengths. Thus some user equipments, e.g., a user equipment located at the center of a cell, can communicate at a higher rate, and some other user equipments, e.g., a user equipment located at the edge of a cell, can communicate only at a lower rate. Data is transmitted to the user equipment preferably in a format matching a channel condition of the user equipment in order to make full use of a transmission bandwidth of the user equipment. A technology to match a format in which data is transmitted to the user equipment with a channel condition of the user equipment is referred to as link adaptation.

The user equipment shall report a Channel Quality Indicator (CQI) according to a channel condition of the user equipment in order to assist the base station in performing link adaptation. The CQI reported from the user equipment corresponds to specific time and frequency resources, that is, the CQI reported from the user equipment represents a capability of transmission over these time and frequency resources. The CQI shall be calculated by the user equipment measuring interference and noise of an adjacent cell to the user equipment, including interference I and noise power N0.

The International Telecommunication Union (ITU) poses a very stringent requirement on the performance of a next-generation mobile communication system, for example, a largest transmission bandwidth of the system up to 100 MHz and a required peak rate of uplink and downlink data transmission up to 1 Gbps and 500 Mbps, and a very high demand for an average spectrum efficiency, particularly an edge spectrum efficiency, of the system. In order to satisfy the requirements on the new system, the 3GPP proposes in Long Term Evolution-Advanced (LTE-A) of a next-generation mobile cellular communication system the use of the technology of coordinated multi-point transmission to improve the performance of the system. The technology of coordinated multi-point transmission relates to coordination between a plurality of transmission points separated in geographical location. In general, the plurality of transmission points are base stations of different cells. The technology of coordinated multi-point transmission is divided into downlink coordinated transmission and uplink joint reception. The technology of downlink coordinated multi-point transmission is generally divided into two categories of joint scheduling and joint transmission. Joint scheduling refers to coordination of time, frequency and space resources between the cells to allocate resources orthogonal to each other for different User Equipments (UEs) in order to avoid mutual interference. Inter-cell interference is a major factor restricting the performance of a UE at the edge of a cell, and thus joint scheduling can lower inter-cell interference to thereby improve the performance of the UE at the edge of the cell. As illustrated in FIG. 1A, joint scheduling of three cells schedules three UEs with possible mutual interference onto resources orthogonal to each other to thereby avoid interference between the cells effectively.

Unlike a joint scheduling scheme in which data is transmitted from only one cell to a UE, data is transmitted concurrently from a plurality of cells to a UE in a joint transmission scheme to thereby enhance reception of a signal at the UE. As illustrated in FIG. 1B, data is transmitted from three cells to a UE over the same resource, and the UE receives signals of the plurality of cells concurrently. Superposition of the useful signals from the plurality of cells can improve the quality of the signal received at the UE on one hand and lower interference to the UE on the other hand to thereby improve the performance of the system.

The user equipment shall further estimate channel state information of a base station in a coordinating cell to the user equipment in addition to a serving cell in order to support coordinated multi-point transmission effectively. Channel state information is estimated by measuring a pilot in the LTE-A. Fig.1C illustrates a mapping relationship of pilots and data in a Physical Resource Block (PRB). The first two Orthogonal Frequency Division Multiplexing (OFDM) symbols are used for transmission of control information, and a data region starts with the third OFDM symbol. The data region includes pilot Resource Elements (REs) and data RE. A pilot of an adjacent cell will typically be mapped onto different REs. This is because a pilot RE is typically at high power and transmitted throughout a bandwidth and there will be very strong interference between pilots mapped onto the same RE to influence the precision of channel estimation. As can be apparent from Fig.1C, a user equipment in a cell 1 shall perform channel estimation on REs corresponding to measurement pilots of a cell 2 and a cell 3 to obtain channel state information of the cell 2 and the cell 3. On these REs, downlink data transmission (e.g., a Physical Downlink Shared Channel (PDSCH)) may be scheduled in the cell 1, that is, the pilots of the cell 2 and the cell 3 will suffer interference of the data transmission in the cell 1. For the user equipment in the cell 1, the strength of a signal received at the user equipment from the cell 1 will typically be far above those of signals of the cell 2 and the cell 3 so that the Signal to Interference and Noise Ratios (SINRs) of the measurement pilots of the cell 2 and the cell 3 will be very low and no channel estimation at satisfactory precision can be obtained. In order to address this problem, the cell 1 can mute those REs on which the cell 2 and the cell 3 transmit the measurement pilots, that is, the cell 1 transmits a signal at zero power at those REs, and this solution is referred to as RE MUTING, and the muted REs are referred to as MUTING REs (see FIG. 1D for details thereof).

The user equipment shall feed back a CQI by estimating interference to the user equipment itself, and interference of an adjacent cell is absent at the location of the pilots in the RE MUTING solution. Interference of an adjacent cell is typically the strongest, and thus the interference estimated at the locations of the pilots will be far below the real interference to the user equipment.

In summary the user equipment may measure interference at lower precision at present if the RE MUTING solution is adopted in the cell.

SUMMARY OF THE INVENTION

Embodiments of the invention provide a method, system and apparatus for measuring interference so as to address the problem in the prior art of lower precision at which a user equipment measures interference if the RE MUTING solution is adopted in a cell.

An embodiment of the invention provides a method of measuring interference, which includes:

a network-side apparatus determining configuration information of a first group of Resource Elements, REs, for interference measurement; and the network-side apparatus generating first interference notification information according to the configuration information of the first group of REs and transmitting the first interference notification information to a user equipment to instruct the user equipment to determine the first group of REs according to the first interference notification information and to measure interference on the determined first group of REs.

An embodiment of the invention provides another method of measuring interference, which includes:

a user equipment determining the locations of a first group of REs for interference measurement according to received first interference notification information from a network-side apparatus; and the user equipment measuring interference on the determined first group of REs.

An embodiment of the invention provides a network-side apparatus including:

a configuration information determining module configured to determine configuration information of a first group of REs for interference measurement;

a generating module configured to generate first interference notification information according to the configuration information of the first group of REs; and a transmitting module configured to transmit the first interference notification information to a user equipment to instruct the user equipment to determine the first group of REs according to the first interference notification information and to measure interference on the determined first group of REs.

An embodiment of the invention provides a user equipment including:

a location determining module configured to determine the locations of a first group of REs for interference measurement according to received first interference notification information from a network-side apparatus; and a measuring module configured to measure interference on the determined first group of REs.

An embodiment of the invention provides a system for measuring interference including:

a network-side apparatus configured to determine configuration information of a first group of REs for interference measurement, to generate first interference notification information according to the determined configuration information of the first group of REs and to transmit the first interference notification information to the user equipment; and the user equipment configured to determine the locations of the first group of REs for interference measurement according to the received first interference notification information from the network-side apparatus and to measure interference on the determined first group of REs.

Since a user equipment is instructed to measure interference on a first group of REs, interference can be measured at improved precision in the RE MUTING solution.

Furthermore if the user equipment determines a CQI from the interference determined in the embodiments of the invention, then also the CQI can be improved in precision so that a base station can perform better link adaptation to thereby improve the efficiency of data transmission.

DETAILED DESCRIPTION OF THE EMBODIMENTS

A network-side apparatus according to an embodiment of the invention generates first interference notification information according to configuration information of a first group of REs for interference measurement and transmits the first interference notification information to a user equipment; the user equipment determines the locations of the first group of REs for interference measurement according to the first interference notification information and measures interference on the determined first group of REs. Since the user equipment is instructed to measure interference on the first group of REs, the interference can be measured at improved precision in the RE MUTING solution.

It shall be noted that RE MUTING in the prior art is merely a denomination, and a solution denominate otherwise but essentially identical to RE MUTING can also be applicable to the embodiment of the invention. Stated otherwise, the first group of REs in the embodiment of the invention is a group of MUTING REs but can alternatively be a group of REs denominated otherwise but functionally identical to MUTING REs.

Embodiments of the invention will be further described below in details with reference to the drawings of the specification.

Figure 1A:
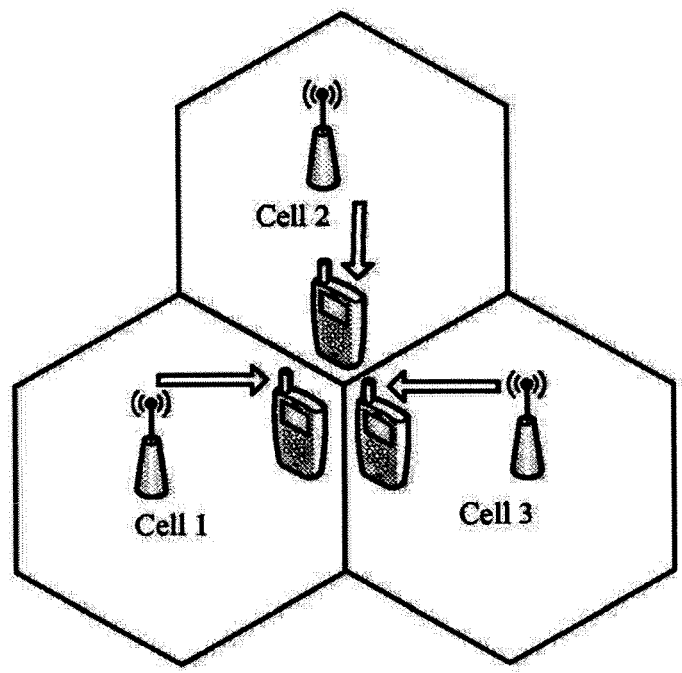
FIG. 1A is a schematic diagram of joint scheduling in the prior art.
Figure 1B:
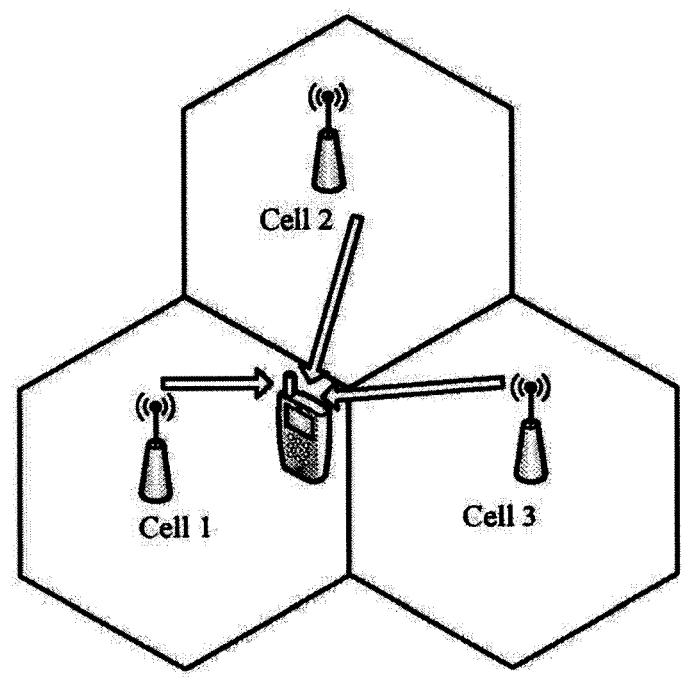
FIG. 1B is a schematic diagram of coordinated transmission in the prior art.
Figure 1C:
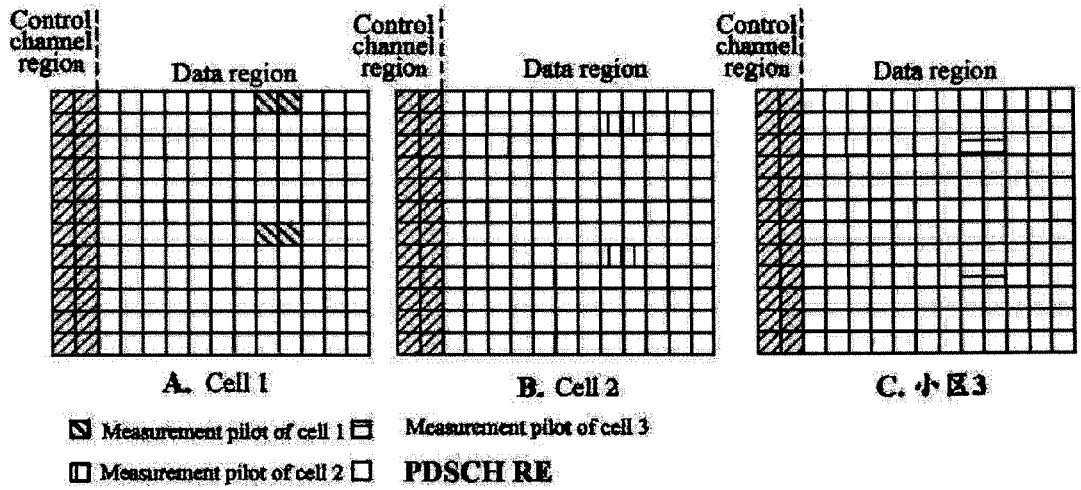
FIG. 1C is a schematic diagram of a mapping relationship between pilots and data in the prior art.
Figure 1D:
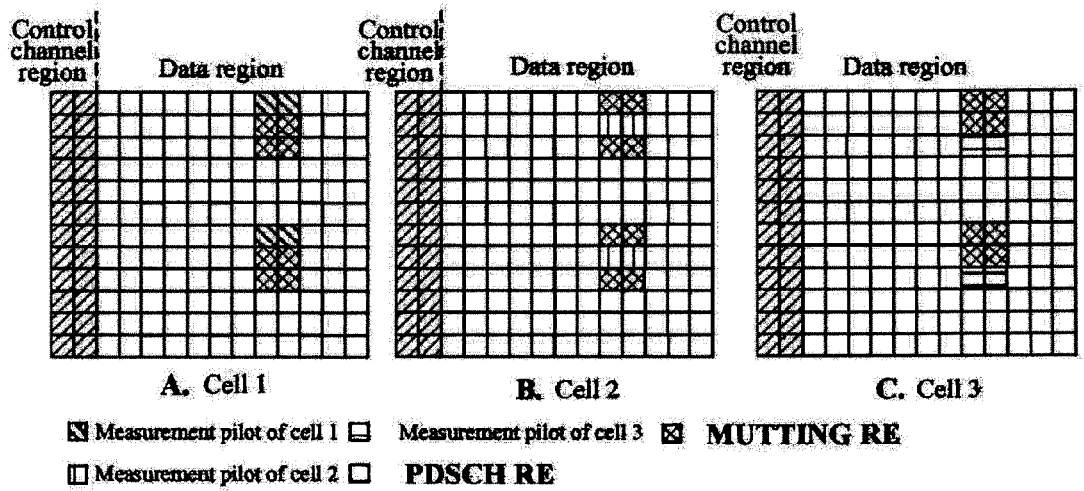
FIG. 1D is a schematic diagram of RE MUTING.
Figure 2:
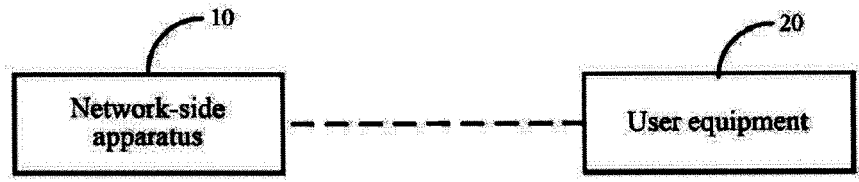
FIG. 2 is a schematic structural diagram of a system for measuring interference according to an embodiment of the invention.

As illustrated in FIG. 2, a system for measuring interference according to an embodiment of the invention includes a network-side apparatus 10 and a user equipment 20.

The network-side apparatus 10 is configured to determine configuration information of a first group of REs for interference measurement, to generate first interference notification information according to the determined configuration information of the first group of REs and to transmit the first interference notification information to the user equipment 20.

The user equipment 20 is configured to determine the locations of the first group of REs for interference measurement according to the received first interference notification information from the network-side apparatus 10 and to measure interference on the determined first group of REs.

Figure 8:
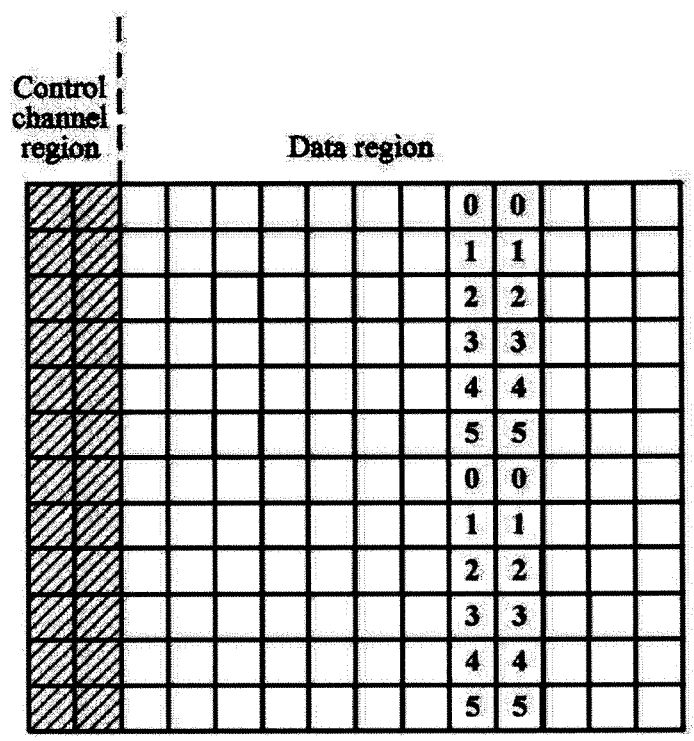
FIG. 8 is a schematic diagram of grouping according to an embodiment of the invention.

Particularly there are a number of REs in each subframe, and a plurality of REs can be selected from all the REs and grouped into a plurality of groups of REs. As illustrated in FIG. 8, for example, 24 REs in two rows are grouped into 6 groups, that is, REs numbered "0" in a group, REs numbered "1" in a group, and so on. A specific grouping condition can be defined in a protocol or negotiated about between the network side and the user equipment side.

In a specific implementation, the resulting plurality of groups of REs can be updated as needed, for example, the number of selected REs, the locations of the REs, the number of resulting groups of REs, the locations of the groups of REs and the numbers and locations of the REs included in the groups of REs can be updated. The specific updated grouping condition can be defined in the protocol or negotiated about between the network side and the user equipment side.

A group of REs here may or may not include REs occupied for a measurement pilot of a serving cell.

Then the network-side apparatus selects a plurality of groups of REs to be muted (i.e., groups composed of MUTING REs) from the resulting groups of REs to form a set of groups of REs and further selects at least one group of REs from the set of groups of REs as a first group of REs, that is, the set of groups of REs is composed of all the groups of MUTING REs.

The number of groups of REs in the set of groups of REs can be larger than the number of groups of REs occupied for pilots of coordinated transmission cells of the user equipment. For example, only a first group and a second group of REs may be required, and the UE can be notified actually of MUTING REs which are the first group and the second group or which are the first, second and third groups, where a group of REs spared thus can facilitate interference estimation at the user equipment 20.

Figure 9:
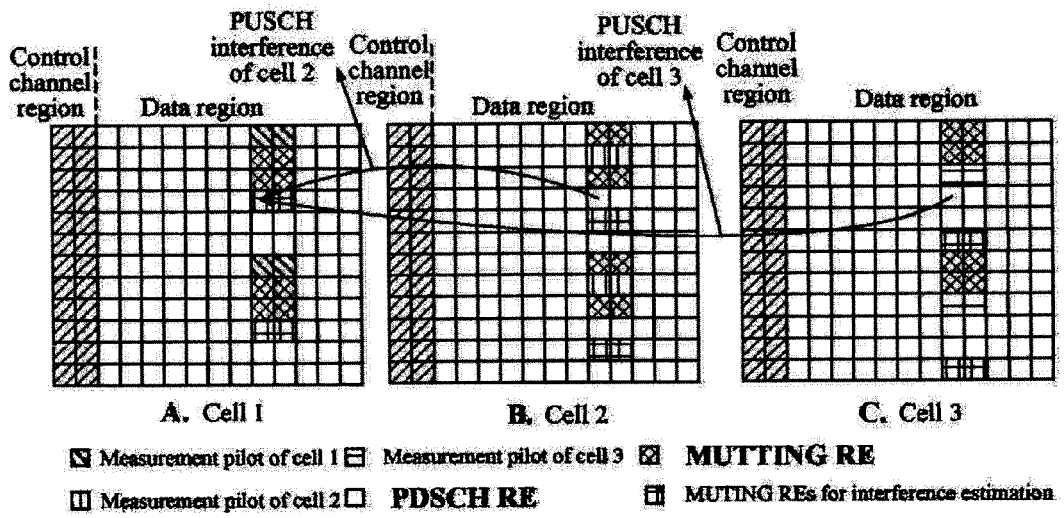
FIG. 9 is a schematic diagram of a first mapping relationship between pilots and data according to an embodiment of the invention.

If the number of groups of REs in the set of groups of REs is larger than the number of groups of REs occupied for pilots of coordinated transmission cells of the user equipment, then a spared group of REs can be taken as the first group of REs. Referring to FIG. 9, a cell 1 notifies the user equipment of a set of groups of REs which are groups {1, 2, 3} (corresponding to the numbered groups in FIG. 8), where the groups 1 and 2 are selected for better estimation of channels of a cell 2 and a cell 3 (i.e., the second groups of REs), and the group 3 of REs are selected for interference estimation (i.e., the first group of REs); and the user equipment can measure interference due to PDSCHs of the two adjacent cells, on the group 3 of REs.

Figure 7:
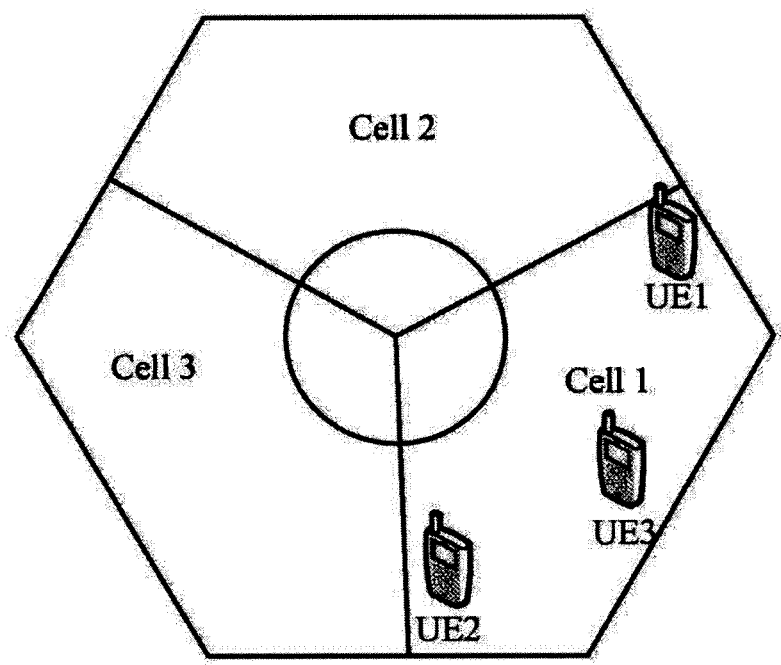
FIG. 7 is a schematic diagram of an application scenario according to an embodiment of the invention.
Figure 10:
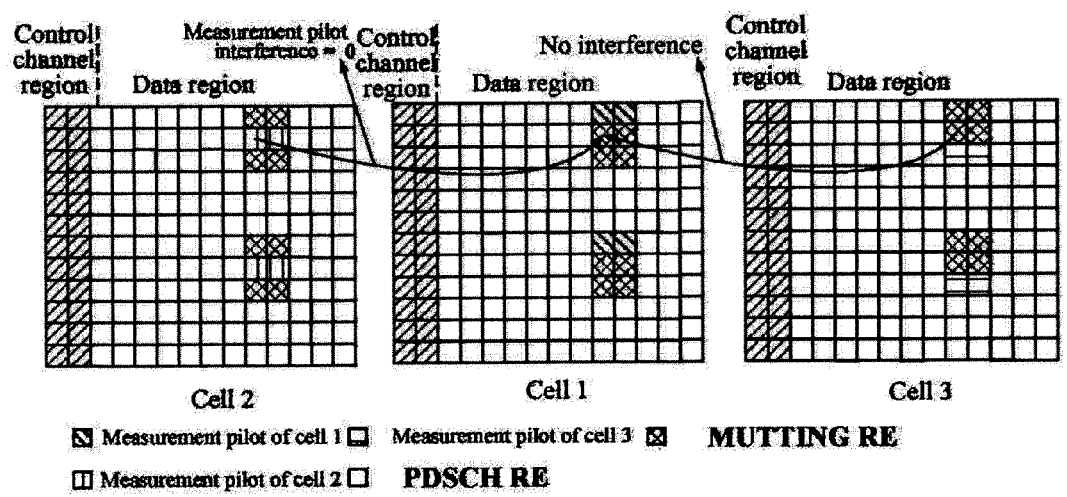
FIG. 10 is a schematic diagram of a second mapping relationship between pilots and data according to an embodiment of the invention.

If the number of groups of REs in the set of groups of REs is equal to the number of groups of REs occupied for pilots of coordinated transmission cells, then the user equipment can be configured according to the location of the user equipment to estimate interference on a specific group of REs. For example, a user equipment 1 in FIG. 7 is located at the edges of the cell 1 and the cell 2, a user equipment 3 is located at the center of the cell 1, and a user equipment 2 is located at the edges of the cells 1 and 3. The network-side apparatus instructs the user equipment 2 to measure interference on the group 1 of REs, and since the user equipment 2 is located at the edges of the cells 1 and 3, the cells 1 and 3 may participate in joint transmission to the UE2, and at this time a signal of the cell 3 will not be interference to the user equipment any more, and a signal of the cell 2 can be ignored at the user equipment 2 due to deep attenuation, so the user equipment 2 can estimate interference thereto during joint transmission accurately. If the user equipment 2 performs single-cell transmission only, then the signal of the cell 3 still is interference to the user equipment, and at this time the network-side apparatus can configure the user equipment 2 to measure interference on the group 2 of REs, and at this time the user equipment 2 still can measure interference of the cell 3 interfering greatly with the user equipment. For the user equipment 3 at the center of the cell 1, both the signals of the cell 2 and the cell 3 to the UE3 are weak, and thus interference measured at the UE3 on the group 1 (or the group 2) of REs can reflect interference to the user equipment during single-cell transmission accurately, see FIG. 10.

Specifically the network-side apparatus 10 selects and determines the first group of REs for interference measurement according to the locations of sets of groups of REs of adjacent cells or the location of the user equipment or randomly.

After the first group of REs is determined, configuration information of each first group of REs can be determined.

Configuration information of a group of REs includes but is not limited to one or more of the following information:

The number of antenna ports, a pilot pattern, a pilot transmission periodicity, a subframe offset, the number of REs in the group of REs, the periodicity and locations in a subframe.

Particularly the pilot pattern refers to the locations of REs in a subframe, which are occupied for a pilot transmitted from a cell.

The network-side apparatus 10 generates the first interference notification information according to the determined configuration information of the first groups of REs in numerous schemes, several of which will be listed below.

In a first scheme, the network-side apparatus 10 determines measurement set information and takes the determined measurement set information as the first interference notification information.

Since the user equipment will measure channel state information of a cell on the second group of REs, that is, the second group of REs is a group of REs used to measure a channel of an adjacent cell, and a different second group of REs corresponds to a different cell, thus configuration information corresponding to the second group of REs and a cell identifier of the corresponding cell can be put in the measurement set information; and the first group of RE also has configuration information but no corresponding cell, and thus a virtual cell identifier can be taken as a cell identifier corresponding to the first group of REs. For example, 504 physical layer cell identifiers in total are defined in the LTE and identified in 9 bits, and thus the identifiers of 504 to 511 can be taken as virtual cell identifiers, and then the configuration information of the first group of REs and the corresponding virtual cell identifier is set in the measurement set information. Stated otherwise, the measurement set information includes the configuration information of each second group of REs in the set of groups of REs and the cell identifier of the cell corresponding to each second group of REs, and the configuration information of each first group of REs and the virtual cell identifier of each first group of REs.

Correspondingly the user equipment 20 determines the configuration information of the first group of REs included in the measurement set information according to the virtual cell identifier corresponding to the first group of REs and determines the locations of the first group of REs according to the determined configuration information upon reception of the first interference notification information.

Specifically the user equipment 20 refers to the corresponding cell identifier, locates the configuration information corresponding to the virtual cell identifier and takes the configuration information as the configuration information of the first group of REs and then can know from the configuration information a periodicity, a subframe offset and the locations in a subframe of the first group of REs.

The measurement set information may not include the configuration information of each first group of REs and the virtual cell identifier corresponding to each first group of REs but only the configuration information of each second group of REs and the cell identifier of the cell corresponding to each second group of REs. Thus the user equipment 20 can be notified implicitly of the configuration information of the first group of REs, but the network-side apparatus 10 shall transmit the configuration information of each group of REs in the set of groups of REs to the user equipment before an implicit notification is applied.

Correspondingly the user equipment 20 receives the configuration information of each group of REs in the set of groups of REs from the network-side apparatus and hereby knows the configuration information of all the groups of REs in the set of groups of REs and then searches in the set of groups of REs for all the non-second groups of REs (that is, belonging to the set of groups of REs but not the second groups of Res), takes the located groups of REs as the first groups of REs, determines the configuration information corresponding to the first groups of REs from the configuration information of all the groups of REs in the set of groups of REs and finally determines from the determined configuration information periodicities, subframe offsets and the locations in a subframe of the first groups of REs.

In a second scheme, the network-side apparatus 10 determines interference measurement indicator information corresponding to the configuration information of the first group of REs according to a correspondence relationship between the configuration information and the interference measurement indicator information and takes the determined interference measurement indicator information as the first interference notification information.

Correspondingly the user equipment 20 determines the configuration information of the first group of REs according to the interference measurement indicator information and determines the locations of the first group of REs according to the determined configuration information.

Particularly the interference measurement indicator information is determined by the network-side apparatus 10 in a bitmap; or The interference measurement indicator information is determined by the network-side apparatus 10 according to the index of the first group of REs, and for example, the user equipment is notified directly of the index of the specific first group of REs to instruct the user equipment to measure interference on group n of REs, and then the user equipment can be notified directly of n; or The interference measurement indicator information is determined by the network-side apparatus 10 according to the configuration information of the first group of REs; or The interference measurement indicator information is determined by the network-side apparatus 10 according to the configuration information of the first group of REs and the virtual cell identifier corresponding to the first group of REs.

If the interference measurement indicator information is determined by the network-side apparatus 10 in a bitmap or the interference measurement indicator information is determined by the network-side apparatus according to the index of the first group of REs, then the network-side apparatus 10 can transmit the configuration information of each group of REs in the set of groups of REs to the user equipment 20 and then determine the corresponding interference measurement indicator information according to the locations of each group of REs. The network-side apparatus 10 can alternatively transmit the configuration information of the first group of REs directly to the user equipment 20 so that the user equipment 20 can determine the locations of the first group of REs more conveniently, and then the user equipment 20 can directly receive the configuration information of the first group of REs and determine the locations of the first group of REs.

For example, the interference measurement indicator information is determined by the network-side apparatus 10 in a bitmap, and as in FIG. 8, there are 6 groups of REs in total, and thus 6-bit interference measurement indicator information is required. Particularly the group 3 is a first group of REs with "0" representing a corresponding group of REs which is not a first group of REs and "1" representing a corresponding group of REs which is a first group of REs, and then the interference measurement indicator information is {0, 0, 0, 1, 0, 0}, where each bit corresponds to a group of REs, and a specific correspondence scheme can be defined in the protocol or negotiated about between the network side and the user equipment side.

If the group 0 of REs therein relates to REs occupied for a measurement pilot of the cell 1, then this will be signaled otherwise. Thus the interference measurement indicator information transmitted to the user equipment can have the bit corresponding to the group 0 removed and be reduced to 5 bits, i.e., {0, 0, 1, 0, 0}, where the first bit corresponds to the group 1, the second bit corresponds to the group 2, and so on.

Correspondingly the user equipment 20 receives the configuration information of all the groups of REs in the set of groups of REs from the network-side apparatus 10, determines the first group of REs in the bitmap and determines the configuration information of the first group of REs from the configuration information of the groups of REs.

Specifically the user equipment 20, upon reception of {0, 0, 0, 1, 0, 0}, searches all the groups of REs for the corresponding group of REs, determines that the group 3 corresponds to "1" and thus knows that the group 3 is a first group of REs, and then searches the configuration information of all the groups of REs in the set of groups of REs for the configuration information of the group 3 an determines from the located configuration information a periodicity, a subframe offset and the locations in a subframe of the first group of REs.

For example, the interference measurement indicator information is determined by the network-side apparatus 10 in a bitmap, and as in FIG. 9, there are 3 groups of REs in total in the set of groups of REs, and thus 3-bit interference measurement indicator information is required. The group 3 in the cell 1 is a first group of REs with "0" representing a corresponding group of REs which is not a first group of REs and "1" representing a corresponding group of REs which is a first group of REs, and then the interference measurement indicator information is {0, 0, 1}, where each bit corresponds to a group of REs, and a specific correspondence scheme can be defined in the protocol or negotiated about between the network side and the user equipment side. If the network-side apparatus 10 transmits the configuration information of all the groups of REs in the set of groups of REs to the use equipment, then the groups of REs in the set of groups of REs shall be numbered in a predetermined order.

Correspondingly the user equipment 20 receives the configuration information of all the groups of REs in the set of groups of REs from the network-side apparatus 10, determines the first group of REs from the set of groups of REs in the bitmap and determines the configuration information of the first group of REs from the received configuration information of all the groups of REs in the set of groups of REs.

Specifically the user equipment 20, upon reception of {0, 0, 1}, searches the groups of REs for the corresponding group of REs, determines that the group 3 corresponds to "1" and thus knows that the group 3 is a first group of REs, and then searches the received configuration information of all the groups of REs in the set of groups of REs for the configuration information of the group 3 and determines from the located configuration information a periodicity, a subframe offset and the locations in a subframe of the first group of REs.

Information on the bitmap or the information on the indexes of the groups of REs can be transmitted to the user equipment in high-layer signaling or transmitted to the user equipment in physical layer signaling.

If the interference measurement indicator information is determined by the network-side apparatus 10 according to the configuration information of the first group of REs (that is, the configuration information of the first group of REs is taken as the interference measurement indicator information) or according to the configuration information of the first group of REs and the virtual cell identifier corresponding to the first group of REs (that is, the configuration information of the first group of REs and the virtual cell identifier corresponding to the first group of REs is taken as the interference measurement indicator information), then it is not necessary to transmit the configuration information of each group of REs in the set of groups of REs to the user equipment 20 because the configuration information of the first group of REs will be transmitted to the user equipment 20.

Correspondingly the user equipment 20, upon separate reception of the configuration information of the first group of REs (or upon separate reception of the configuration information of the first group of REs and the virtual cell identifier corresponding to the first group of REs), thus knows that the configuration information corresponds to a group of REs which is a first group of REs and determines from the configuration information the locations of the first group of REs.

It shall be noted that the interference measurement indicator information according to the embodiment of the invention will not be limited to the foregoing four kinds, and all the other contents which can have the user equipment determine the configuration information of the first group of REs can be taken as the interference measurement indicator information according to the embodiment of the invention.

If the network-side apparatus 10 shall transmit the measurement set information and the interference measurement indicator information, for example, transmit the measurement set information including only the configuration information of each second group of REs and the cell identifier of the cell corresponding to each second group of REs and the interference measurement indicator information, to the user equipment 20, then at this time the measurement set information and the interference measurement indicator information can be transmitted together or can be transmitted separately.

In an implementation, the network-side apparatus 10 can transmit the configuration information of each group of REs in the set of groups of REs or only the configuration information of the first group of REs to the user equipment 20 regardless of whichever scheme is adopted.

Particularly if the configuration information includes information on the locations in a subframe, then the location information can also be determined in a bitmap. For example as in FIG. 8, there are 6 groups in total, and this requires 6-bit location information. If the group 1 and the group 2 are groups of MUTING REs with "0" representing a corresponding group of REs which is not a group of MUTING REs and "1" representing a corresponding group of REs which is a group of MUTING REs, then the location information is {0, 1, 1, 0, 0, 0}, where each bit corresponds to a group of REs, and a specific correspondence scheme can be defined in the protocol or negotiated about between the network side and the user equipment side.

It shall be noted other information which can determine the locations, e.g., information on a index, can also be taken as the location information according to the embodiment of the invention in addition to a bitmap.

In a specific implementation, the network-side apparatus 10 generates the first interference notification information according to the determined configuration information of the first group of REs upon determining that the user equipment 20 shall measure interference on the first group of REs.

If the network-side apparatus 10 determines second interference notification information upon determining that it is not necessary for the user equipment 20 to measure interference on the first group of REs, then the apparatus transmits the second interference notification information to the user equipment to instruct the user equipment to measure interference according to a CRS and/or a measurement pilot.

For example, all the possible groups of REs are occupied for the second groups of REs, and no appropriate group of REs can be located for the user equipment to estimate interference; or An overhead is controlled because introduction of an additional first group of REs may result in an increased overhead; or It is determined that the user equipment can estimate interference accurately according to a CRS and/or a measurement pilot.

Particularly the second interference notification information is determined by the network-side apparatus 10 in a bitmap; or The second interference notification information is determined by the network-side apparatus 10 according to a virtual cell identifier.

If the second interference notification information is determined by the network-side apparatus 10 in a bitmap, then the foregoing interference measurement indicator information can be used. Specifically it can be determined in 2 bits, where the first one of the 2 bits corresponds to a CRS and the second bit corresponds to a measurement pilot with "0" representing No and "1" representing Yes. If the user equipment shall measure interference according to a CRS, then the 2 bits are 10; if the user equipment shall measure interference according to a measurement pilot, then the 2 bits are 01; and if the user equipment shall measure interference according to a Common Reference Signal (CRS) and a measurement pilot, then the 2 bits are 11.

In a specific implementation, 2 bits can further be added in the interference measurement indicator information, and thus the first interference notification information and the second interference notification information can be integrated into a piece of interference notification information. For example, 6 bits are required for the interference measurement indicator information, and then 2 bits can be added at the tail thereof, and at this time the interference measurement indicator information becomes 8 bits. If it is determined that the user equipment 20 shall measure interference on the first group of REs, then the first 6 bits of the interference measurement indicator information are determined in a bitmap and the last 2 bits are all-zero; and if it is determined that it is not necessary for the user equipment 20 to measure interference on the first group of REs, then the first 6 bits of the interference measurement indicator information are all-zero and the last 2 bits are determined as needed.

Correspondingly if the user equipment 20 receives the 2-bit information, then it thus knows that it is not necessary to measure interference on the first group of REs, and further knows from the specific bit values which scheme is adopted to measure interference; and if the user equipment 20 receives the interference measurement indicator information, the last 2 bits of which are not all-zero, then it thus knows that it is not necessary to measure interference on the first group of REs, and further knows from the specific bit values which scheme is adopted to measure interference.

If the second interference notification information is determined by the network-side apparatus 10 according to a virtual cell identifier, then a virtual cell identifier can be transmitted directly, where, for example, a CRS corresponds to a virtual cell identifier A, and a measurement pilot corresponds to a virtual cell identifier B, so that it is known upon reception of A that the CRS is adopted to measure interference; it is known upon reception of B that the measurement pilot is adopted to measure interference; and it is known upon reception of A and B that the CRS and the measurement pilot are used to measure interference.

Particularly the network-side apparatus 10 can transmit all the information to the user equipment 20 in higher-layer signaling (e.g., RRC signaling).

The user equipment 20 can measure interference on the determined first group of REs by determining an average received power value on the first group of REs and taking the determined average power value as an interference estimation value.

The network-side apparatus 10 according to the embodiment of the invention can be a Node B (e.g., a macro Node B, an evolved Node B, a home Node B, etc.) or can be a Relay Node (RN) apparatus or other network-side apparatuses.

Based upon the same inventive idea, there are further provided in embodiments of the invention two methods of measuring interference, a network-side apparatus and a user equipment, and since these methods and apparatuses address the problem under a similar principle to the system for measuring interference according to the embodiment of the invention, reference can be made to the implementations of the system for implementations of these methods and apparatuses, a repeated description of which will be omitted here.

Figure 3:
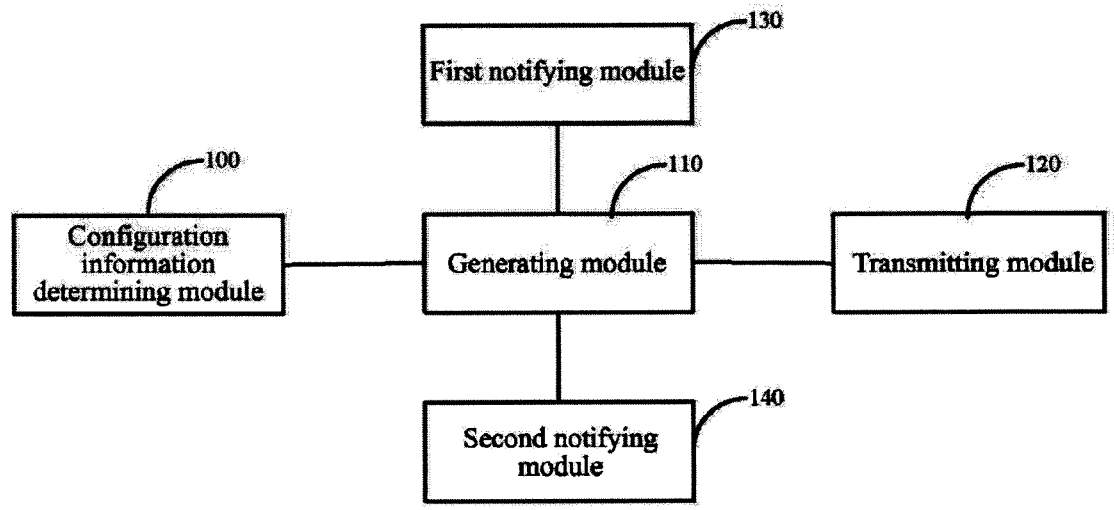
FIG. 3 is a schematic structural diagram of a network-side apparatus according to an embodiment of the invention.

As illustrated in FIG. 3, a network-side apparatus according to an embodiment of the invention includes a configuration information determining module 100, a generating module 110 and a transmitting module 120.

The configuration information determining module 100 is configured to determine configuration information of a first group of REs for interference measurement.

The generating module 110 is configured to generate first interference notification information according to the configuration information of the first group of REs determined by the configuration information determining module 100.

The transmitting module 120 is configured to transmit the first interference notification information generated by the generating module 110 to a user equipment to instruct the user equipment to determine the first group of REs according to the first interference notification information and to measure interference on the determined first group of REs.

Particularly the generating module 110 determines measurement set information and takes the determined measurement set information as the first interference notification information, where the measurement set information includes configuration information of each second group of REs and a cell identifier of a cell corresponding to each second group of REs and configuration information of each first group of REs and a virtual cell identifier corresponding to each first group of REs, or the measurement set information includes only configuration information of each second group of REs and a cell identifier of a cell corresponding to each second group of REs;

Particularly the second group of REs is a group of REs used to measure a channel of an adjacent cell.

When interference measurement indicator information is determined by the network-side apparatus in a bit map or interference measurement indicator information is determined by the network-side apparatus according to the index of the first group of REs, the transmitting module is further configured to transmit the configuration information of the first group of REs to the user equipment.

If the measurement set information includes only configuration information of each second group of REs and a cell identifier of a cell corresponding to each second group of REs, Then the network-side apparatus according to the embodiment of the invention further includes a first notifying module 130.

The first notifying module 130 is configured to transmit the configuration information of each group of REs in a set of groups of REs to the user equipment.

Particularly the generating module 110 determines interference measurement indicator information corresponding to the configuration information of the first group of REs according to a correspondence relationship between the configuration information and the interference measurement indicator information and takes the determined interference measurement indicator information as the first interference notification information.

The interference measurement indicator information is determined by the generating module 110 in a bitmap; or The interference measurement indicator information is determined by the generating module 110 according to the configuration information of the first group of REs; or The interference measurement indicator information is determined by the generating module 110 according to the index of the first group of REs; or The interference measurement indicator information is determined by the generating module 110 according to the configuration information of the first group of REs and a virtual cell identifier corresponding to the first group of REs.

If the interference measurement indicator information is determined by the generating module 110 in a bitmap or the interference measurement indicator information is determined by the generating module 110 according to the index of the first group of REs, Then the network-side apparatus according to the embodiment of the invention further includes a second notifying module 140.

The second notifying module 140 is configured to transmit the configuration information of each group of REs in a set of groups of REs to the user equipment;

Particularly the set of groups of REs is composed of the first groups of RE and the second groups of REs.

The generating module 110 can further generate the first interference notification information according to the determined configuration information of the first group of REs upon determining that the user equipment shall measure interference on the first group of REs.

The generating module 110 generates second interference notification information if it is determined that it is not necessary for the user equipment to measure interference on the first group of REs; and correspondingly the transmitting module 120 transmits the second interference notification information to the user equipment to instruct the user equipment to measure interference according to a CRS and/or a measurement pilot.

Figure 4:
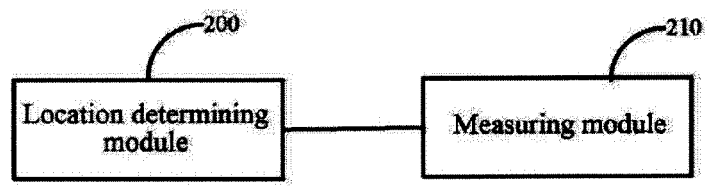
FIG. 4 is a schematic structural diagram of a user equipment according to an embodiment of the invention.

As illustrated in FIG. 4, a user equipment according to an embodiment of the invention includes a location determining module 200 and a measuring module 210.

The location determining module 200 is configured to determine the locations of a first group of REs for interference measurement according to received first interference notification information from a network-side apparatus.

The measuring module 210 is configured to measure interference on the first group of REs determined by the location determining module 200.

If the first interference notification information is measurement set information including configuration information of each second group of REs and a cell identifier of a cell corresponding to each second group of REs and configuration information of each first group of REs and a virtual cell identifier corresponding to each first group of REs, where the second group of REs is a group of REs used to measure a channel of an adjacent cell, Then the location determining module 200 determines the configuration information of the first group of REs included in the measurement set information according to the virtual cell identifier corresponding to the first group of REs and determines the locations of the first group of REs according to the determined configuration information.

If the first interference notification information is measurement set information including only configuration information of each second group of REs and a cell identifier of a cell corresponding to each second group of REs, where the second group of REs is a group of REs used to measure a channel of an adjacent cell, Then the location determining module 200 receives the configuration information of each group of REs in a set of groups of REs from the network-side apparatus, searches the configuration information of all the groups of REs in the set of groups of REs for a non-second group of REs, takes the located group of REs as the first group of REs, and determines the configuration information of the first group of REs from the received set of groups of REs and determines the locations of the first group of REs according to the determined configuration information, where the set of groups of REs is composed of all the groups of MUTING REs.

If the first interference notification information is interference measurement indicator information, Then the location determining module 200 determines the configuration information of the first group of REs according to the interference measurement indicator information and determines the locations of the first group of REs according to the determined configuration information.

If the interference measurement indicator information is determined by the network-side apparatus in a bitmap, Then the location determining module 200 receives the configuration information of all the groups of REs in a set of groups of REs from the network-side apparatus, determines the first group of REs from all the groups of REs in the bitmap and determines the configuration information of the first group of REs from the received configuration information of all the groups of REs in the set of groups of REs;

If the interference measurement indicator information is determined by the network-side apparatus according to the index of the first group of REs, then the location determining module 20 receives the configuration information of all the groups of REs in a set of groups of REs from the network-side apparatus, determines the first group of REs from all the groups of REs in the set of groups of REs according to the index and determines the configuration information of the first group of REs from the received configuration information of all the groups of REs in the set of groups of REs; and Particularly the set of groups of REs is composed of the first groups of REs and the second groups of REs.

When the interference measurement indicator information is determined by the network-side apparatus in a bitmap or the interference measurement indicator information is determined by the network-side apparatus according to the index of the first group of REs, The location determining module 20 can be further configured to receive the configuration information of the first group of REs from the network side.

Particularly the measuring module 210 determines an average received power value on the first group of REs and takes the determined average received power value as an interference estimation value.

Figure 5:
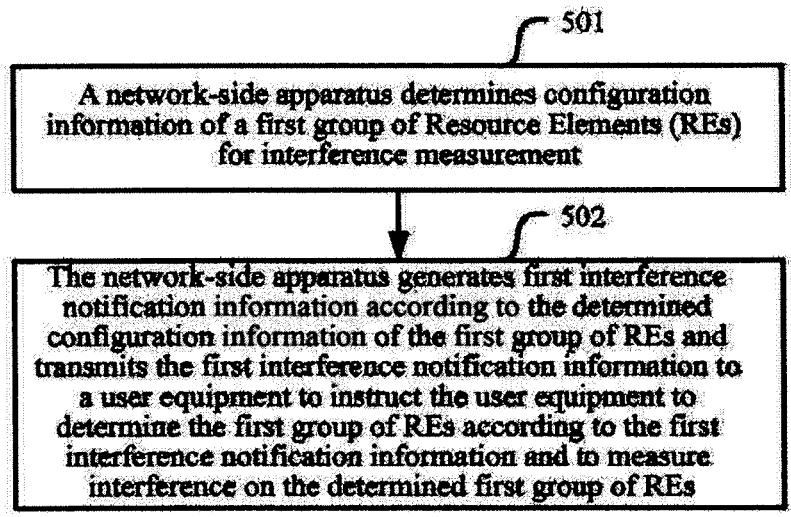
FIG. 5 is a schematic flow chart of a first method of measuring interference according to an embodiment of the invention.

As illustrated in FIG. 5, a first method of measuring interference according to an embodiment of the invention includes the following steps:

Step 501. A network-side apparatus determines configuration information of a first group of REs for interference measurement.

Step 502. The network-side apparatus generates first interference notification information according to the determined configuration information of the first group of REs and transmits the first interference notification information to a user equipment to instruct the user equipment to determine the first group of REs according to the first interference notification information and to measure interference on the determined first group of REs.

Particularly there are a number of REs in each subframe, and a plurality of REs can be selected from all the REs and grouped into a plurality of groups of REs. A specific grouping condition can be defined in a protocol or negotiated about between the network side and the user equipment side.

In a specific implementation, the resulting plurality of groups of REs can be updated as needed. The specific updated grouping condition can be defined in the protocol or negotiated about between the network side and the user equipment side.

A group of REs here may or may not include REs occupied for a measurement pilot of a serving cell.

Then the network-side apparatus 10 selects a plurality of groups of REs to be muted (i.e., groups composed of MUTING REs) from the resulting groups of REs to form a set of groups of REs and further selects at least one group of REs from the set of groups of REs as a first group of REs, that is, the set of groups of REs is composed of all the groups of MUTING REs.

The number of groups of REs in the set of groups of REs can be larger than the number of groups of REs occupied for pilots of coordinated transmission cells of the user equipment.

Specifically the network-side apparatus selects and determines the first group of REs for interference measurement according to the locations of sets of groups of REs of adjacent cells or the location of the user equipment or randomly.

After the first group of REs is determined, configuration information of each first group of REs can be determined.

Configuration information of a group of REs includes but is not limited to one or more of the following information:

The number of antenna ports, a pilot pattern, a pilot transmission periodicity, a subframe offset, the number of REs in the group of REs, periodicity and locations in a subframe.

In the step 502, the network-side apparatus generates the first interference notification information according to the determined configuration information of the first groups of REs in numerous schemes, several of which will be listed below.

In a first scheme, the network-side apparatus determines measurement set information and takes the determined measurement set information as the first interference notification information.

Since the user equipment will measure channel state information of a cell on the second group of REs, that is, the second group of REs is a group of REs used to measure a channel of an adjacent cell, and a different second group of REs corresponds to a different cell, thus configuration information corresponding to the second group of REs and a cell identifier of the corresponding cell can be put in the measurement set information; and the first group of RE also has configuration information but no corresponding cell, and thus a virtual cell identifier can be taken as a cell identifier corresponding to the first group of REs. For example, 504 physical layer cell identifiers in total are defined in the LTE and identified in 9 bits, and thus the identifiers of 504 to 511 can be taken as virtual cell identifiers, and then the configuration information of the first group of REs and the corresponding virtual cell identifier is set in the measurement set information. Stated otherwise, the measurement set information includes the configuration information of each second group of REs in the set of groups of REs and the cell identifier of the cell corresponding to each second group of REs, and the configuration information of each first group of REs and the virtual cell identifier of each first group of REs.

The measurement set information may not include the configuration information of each first group of REs and the virtual cell identifier corresponding to each first group of REs but only the configuration information of each second group of REs and the cell identifier of the cell corresponding to each second group of REs. Thus the user equipment can be notified implicitly of the configuration information of the first group of REs, but the network-side apparatus shall transmit the configuration information of each group of REs in the set of groups of REs to the user equipment before an implicit notification is applied.

In a second scheme, the network-side apparatus determines interference measurement indicator information corresponding to the configuration information of the first group of REs according to a correspondence relationship between the configuration information and the interference measurement indicator information and takes the determined interference measurement indicator information as the first interference notification information.

Particularly the interference measurement indicator information is determined by the network-side apparatus in a bitmap; or The interference measurement indicator information is determined by the network-side apparatus according to the index of the first group of REs; or The interference measurement indicator information is determined by the network-side apparatus according to the configuration information of the first group of REs; or The interference measurement indicator information is determined by the network-side apparatus according to the configuration information of the first group of REs and the virtual cell identifier of the first group of REs.

If the interference measurement indicator information is determined by the network-side apparatus in a bitmap or the interference measurement indicator information is determined by the network-side apparatus according to the index of the first group of REs, then the network-side apparatus can transmit the configuration information of each group of REs in the set of groups of REs to the user equipment and then determine the corresponding interference measurement indicator information according to the locations of each group of REs. Alternatively, the network-side apparatus may directly transmit the configuration information of the first group of REs to the user equipment.

If the interference measurement indicator information is determined by the network-side apparatus according to the configuration information of the first group of REs or according to the configuration information of the first group of REs and the virtual cell identifier corresponding to the first group of REs, then it is not necessary to transmit the configuration information of each group of REs in the set of groups of REs to the user equipment because the configuration information of the first group of REs will be transmitted to the user equipment.

It shall be noted that the interference measurement indicator information according to the embodiment of the invention will not be limited to the foregoing four kinds, and all the other contents which can have the user equipment determine the configuration information of the first group of REs can be taken as the interference measurement indicator information according to the embodiment of the invention.

If the network-side apparatus shall transmit the measurement set information and the interference measurement indicator information, for example, transmit the measurement set information including only the configuration information of each second group of REs and the cell identifier of the cell corresponding to each second group of REs and the interference measurement indicator information, to the user equipment, then at this time the measurement set information and the interference measurement indicator information can be transmitted together or can be transmitted separately.

In an implementation, the network-side apparatus can transmit the configuration information of each group of REs in the set of groups of REs or only the configuration information of the first group of REs to the user equipment regardless of whichever scheme is adopted.

Particularly if the configuration information includes information on the locations in a subframe, then the location information can also be determined in a bitmap.

In a specific implementation, the network-side apparatus generates the first interference notification information according to the determined configuration information of the first group of REs upon determining that the user equipment shall measure interference on the first group of REs.

If the network-side apparatus determines second interference notification information upon determining that it is not necessary for the user equipment to measure interference on the first group of REs, then the apparatus transmits the second interference notification information to the user equipment to instruct the user equipment to measure interference according to a CRS and/or a measurement pilot.

For example, all the possible groups of REs are occupied for the second groups of REs, and no appropriate group of REs can be located for the user equipment to estimate interference; Or An overhead is controlled because introduction of an additional first group of REs may result in an increased overhead; or It is determined that the user equipment can estimate interference accurately according to a CRS and/or a measurement pilot.

Particularly the second interference notification information is determined by the network-side apparatus in a bitmap; or The second interference notification information is determined by the network-side apparatus according to a virtual cell identifier.

If the second interference notification information is determined by the network-side apparatus in a bitmap, then the foregoing interference measurement indicator information can be used.

In a specific implementation, 2 bits can further be added in the interference measurement indicator information, and thus the first interference notification information and the second interference notification information can be integrated into a piece of interference notification information. For example, 6 bits are required for the interference measurement indicator information, and then 2 bits can be added at the tail thereof, and at this time the interference measurement indicator information becomes 8 bits. If it is determined that the user equipment 20 shall measure interference on the first group of REs, then the first 6 bits of the interference measurement indicator information are determined in a bitmap and the last 2 bits are all-zero; and if it is determined that it is not necessary for the user equipment 20 to measure interference on the first group of REs, then the first 6 bits of the interference measurement indicator information are all-zero and the last 2 bits are determined as needed.

If the second interference notification information is determined by the network-side apparatus according to a virtual cell identifier, then a virtual cell identifier can be transmitted directly.

Particularly the network-side apparatus can transmit all the information to the user equipment in higher-layer signaling (e.g., RRC signaling).

The network-side apparatus according to the embodiment of the invention can be a Node B (e.g., a macro Node B, an evolved Node B, a home Node B, etc.) or can be a Relay Node (RN) apparatus or other network-side apparatuses.

Figure 6:
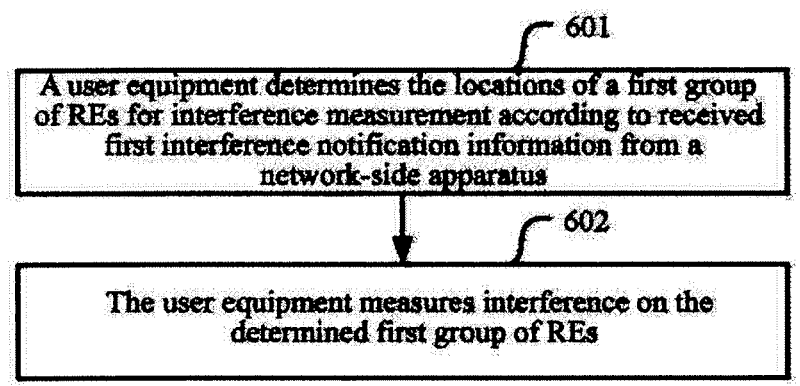
FIG. 6 is a schematic flow chart of a second method of measuring interference according to an embodiment of the invention.

As illustrated in FIG. 6, a second method of measuring interference according to an embodiment includes the following steps:

Step 601. A user equipment determines the locations of a first group of REs for interference measurement according to received first interference notification information from a network-side apparatus.

Step 602. The user equipment measures interference on the determined first group of REs.

If the first interference notification information is measurement set information including configuration information of each second group of REs and a cell identifier of a cell corresponding to each second group of REs and configuration information of each first group of REs and a virtual cell identifier corresponding to each first group of REs, where the second group of REs is a group of REs used to measure a channel of an adjacent cell, Then in the step 601, the user equipment determines the configuration information of the first group of REs included in the measurement set information according to the virtual cell identifier corresponding to the first group of REs and determines the locations of the first group of REs according to the determined configuration information upon reception of the first interference notification information Specifically the user equipment refers to the corresponding cell identifier, locates the configuration information corresponding to the virtual cell identifier and takes the configuration information as the configuration information of the first group of REs and then can know from the configuration information a periodicity, a subframe offset and the locations in a subframe of the first group of REs.

If the first interference notification information is measurement set information including only configuration information of each second group of REs and a cell identifier of a cell corresponding to each second group of REs, where a set of groups of REs are composed of the first groups of REs and the second groups of REs, Then before the step 601, the user equipment receives the configuration information of each group of REs in the set of groups of REs from the network-side apparatus and thus knows the configuration information of all the groups of REs in the set of groups of REs, and then searches the set of groups of REs for all the non-second groups of REs (that is, belonging to the set of groups of REs but not the second groups of REs), takes the located groups of REs as the first groups of REs, determines the configuration information corresponding to the first groups of REs from the configuration information of all the groups of REs in the set of groups of REs and finally determines from the determined configuration information periodicities, subframe offsets and the locations in a subframe of the first groups of REs.

If the first interference notification information is interference measurement indicator information, Then in the step 601, the user equipment determines the configuration information of the first group of REs according to the interference measurement indicator information and determines the locations of the first group of REs according to the determined configuration information.

Particularly the interference measurement indicator information is determined by the network-side apparatus in a bitmap; or The interference measurement indicator information is determined by the network-side apparatus according to the index of the first group of REs, and for example, the user equipment is notified directly of the index of the specific first group of REs to instruct the user equipment to measure interference on group n of REs, and then the user equipment can be notified directly of n; or The interference measurement indicator information is determined by the network-side apparatus according to the configuration information of the first group of REs; or The interference measurement indicator information is determined by the network-side apparatus according to the configuration information of the first group of REs and the virtual cell identifier corresponding to the first group of REs.

If the interference measurement indicator information is determined by the network-side apparatus 10 in a bit map or the interference measurement indicator information is determined by the network-side apparatus according to the index of the first group of REs, then before the step 601, the user equipment receives the configuration information of all the groups of REs in the set of groups of REs or the configuration information of the first group of REs from the network-side apparatus, and in the step 601, the user equipment determines the first group of REs in the bitmap or according to the index and determines the configuration information of the first group of REs from the received configuration information of the groups of REs.

If the interference measurement indicator information is determined by the network-side apparatus 10 according to the configuration information of the first group of REs or according to the configuration information of the first group of REs and the virtual cell identifier corresponding to the first group of REs, then in the step 601, the user equipment, upon separate reception of the configuration information of the first group of REs (or upon separate reception of the configuration information of the first group of REs and the virtual cell identifier corresponding to the first group of REs), thus knows that the configuration information corresponds to a group of REs which is a first group of REs and determines from the configuration information the locations of the first group of REs.

It shall be noted that the interference measurement indicator information according to the embodiment of the invention will not be limited to the foregoing four kinds, and all the other contents which can have the user equipment determine the configuration information of the first group of REs can be taken as the interference measurement indicator information according to the embodiment of the invention.

In the step 602, the user equipment 20 can measure interference on the determined first group of REs by determining an average received power value on the first group of REs and taking the determined average power value as an interference estimation value.

Particularly the method according to the embodiment of the invention further includes:

If the user equipment receives second interference notification information from the network side, then the user equipment measures interference according to a CRS and/or a measurement pilot in response to an instruction of the second interference notification information.

If the second interference notification information is determined by the network-side apparatus 10 in a bitmap, then it is assumed that the first one of 2 bits corresponds to a CRS and the second bit corresponds to a measurement pilot with "0" representing No and "1" representing Yes. If the 2 bits are 10, then it is determined that interference is measured according to a CRS; if the 2 bits are 01, then it is determined that interference is measured according to a measurement pilot; and if the 2 bits are 11, then it is determined that interference is measured according to a CRS and a measurement pilot.

In a specific implementation, 2 bits can further be added in the interference measurement indicator information, and thus the first interference notification information and the second interference notification information can be integrated into a piece of interference notification information. For example, 6 bits are required for the interference measurement indicator information, and then 2 bits can be added at the tail thereof, and at this time the interference measurement indicator information becomes 8 bits. If the first 6 bits of the interference measurement indicator information received by the user equipment are not all-zero and the last 2 bits are all-zero, then it is determined that it is necessary to measure interference on the first group of REs; and if the first 6 bits of the interference measurement indicator information received by the user equipment are all-zero and the last 2 bits are not all-zero, then it is determined that it is not necessary to measure interference on the first group of REs, and further a measurement scheme is determined according to the last 2 bits.

If the second interference notification information is determined by the network-side apparatus according to a virtual cell identifier, then the user equipment can determine a measurement scheme according to a corresponding virtual cell identifier, where, for example, a CRS corresponds to a virtual cell identifier A, and a measurement pilot corresponds to a virtual cell identifier B, so that it is known upon reception of A that the CRS is adopted to measure interference; it is known upon reception of B that the measurement pilot is adopted to measure interference; and it is known upon reception of A and B that the CRS and the measurement pilot are used to measure interference.

Particularly FIG. 5 and FIG. 6 can be integrated into a flow resulting in a new method of measuring interference, that is, firstly the steps 501 and 502 and then the steps 601 and 602 are performed.

Figure 11:
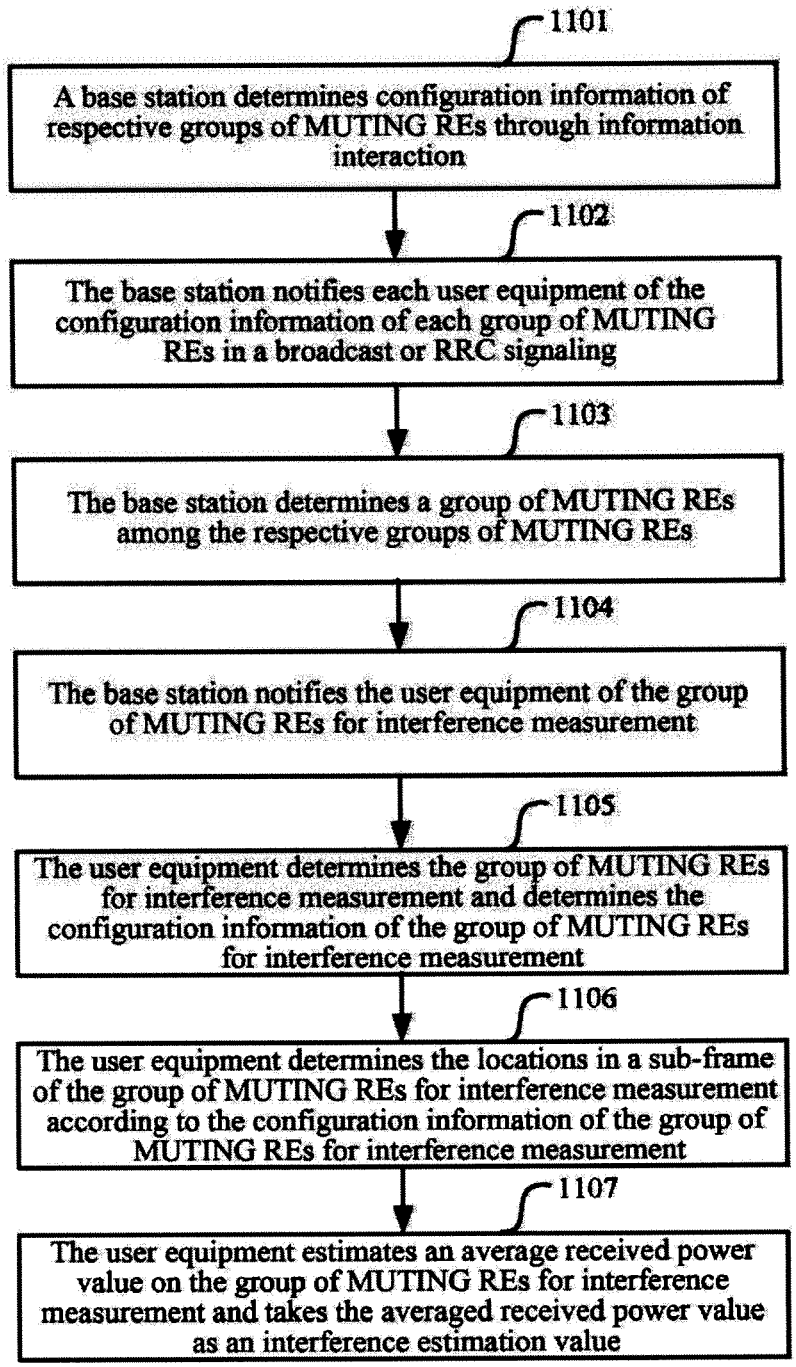
FIG. 11 is a schematic flow chart of a method of measuring interference using a MUTING RE according to an embodiment of the invention.

As illustrated in FIG. 11, a method of measuring interference using MUTING REs according to an embodiment of the invention includes the following steps:

Step 1101. A base station determines configuration information of respective groups of MUTING REs through information interaction.

Step 1102. The base station notifies each user equipment of the configuration information of each group of MUTING REs in a broadcast or RRC signaling.

Particularly the configuration information includes the number and locations of MUTING REs, etc.; and information on the locations of the MUTING REs includes a periodicity, a subframe offset, the locations in a subframe, etc.; and the user equipment is notified of the information on the locations of the MUTING REs primarily for the purpose of enabling the user equipment to calculate rate-matching parameter correctly to thereby perform correct demodulation.

Step 1103. The base station determines a group of MUTING REs for interference measurement among the respective groups of MUTING REs.

Step 1104. The base station notifies the user equipment of the group of MUTING REs for interference measurement.

Step 1105. The user equipment determines the group of MUTING REs for interference measurement and determines the configuration information of the group of MUTING REs for interference measurement.

Step 1106. The user equipment determines the locations in a subframe of the group of MUTING REs for interference measurement according to the configuration information of the group of MUTING REs for interference measurement.

Step 1107. The user equipment estimates an average received power value on the group of MUTING REs for interference measurement and takes the averaged received power value as an interference estimation value.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

As can be apparent from the foregoing embodiments, since a user equipment is instructed to measure interference on a first group of REs, interference can be measured at improved precision in the RE MUTING solution.

Furthermore if the user equipment determines a CQI from the interference determined in the embodiments of the invention, then also the CQI can be improved in precision so that an eNB can perform better link adaptation to thereby improve the efficiency of data transmission.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method of measuring interference, wherein the method comprises:
   a network-side apparatus determining configuration information of a first group of Resource Elements, REs, for interference measurement; and
   the network-side apparatus generating first interference notification information according to the configuration information of the first group of REs and transmitting the first interference notification information to a user equipment to instruct the user equipment to determine the first group of REs according to the first interference notification information and to measure interference on the determined first group of REs by taking received signal on the first group of REs as interference,
   wherein the network-side apparatus generating first interference notification information comprises:
      the network-side apparatus determining interference measurement indicator information corresponding to the configuration information of the first group of REs according to a correspondence relationship between the configuration information and the interference measurement indicator information and taking the determined interference measurement indicator information as the first interference notification information.

2. The method according to claim 1, wherein the interference measurement indicator information is determined by the network-side apparatus in a bitmap; or
   the interference measurement indicator information is determined by the network-side apparatus according to the configuration information of the first group of REs; or
   the interference measurement indicator information is determined by the network-side apparatus according to an index of the first group of REs; or
   the interference measurement indicator information is determined by the network-side apparatus according to the configuration information of the first group of REs and a virtual cell identifier corresponding to the first group of REs.

3. The method according to claim 2, wherein when the interference measurement indicator information is determined by the network-side apparatus in a bitmap or the interference measurement indicator information is determined by the network-side apparatus according to the index of the first group of REs, before the network-side apparatus generates the first interference notification information, the method further comprises:
   the network-side apparatus transmitting configuration information of each group of REs in a set of groups of REs to the user equipment;
   wherein the set of groups of REs comprises all the groups of MUTING REs.

4. The method according to claim 2, wherein when the interference measurement indicator information is determined by the network-side apparatus in a bitmap or the interference measurement indicator information is determined by the network-side apparatus according to the index of the first group of REs, the method further comprises:
   the network-side apparatus transmitting the configuration information of the first group of REs to the user equipment.

5. The method according to claim 1, wherein the configuration information of the group of REs includes one or more of:
   the number of antenna ports, a pilot pattern, a pilot transmission periodicity, a subframe offset, the number of REs in the group of REs, periodicity and locations in a subframe.

6. The method according to claim 1, wherein before the network-side apparatus generates the first interference notification information, the method further comprises:

the network-side apparatus determining that it is necessary for the user equipment to measure interference on the first group of REs, wherein the method further comprises the network-side apparatus determining second interference notification information upon determining that it is not necessary for the user equipment to measure interference on the first group of REs and transmitting the second interference notification information to the user equipment to instruct the user equipment to measure interference according to a Common Reference Signal, CRS, and/or a measurement pilot.

7. The method according to claim 6, wherein the second interference notification information is determined by the network-side apparatus in a bit map; or the second interference notification information is determined by the network-side apparatus according to a virtual cell identifier.

8. A method of measuring interference, wherein the method comprises:

a user equipment determining locations of a first group of REs for interference measurement according to received first interference notification information from a network-side apparatus; and the user equipment measuring interference on the determined first group of REs by taking received signal on the first group of REs as interference, wherein when the first interference notification information is interference measurement indicator information, the user equipment determining the locations of a first group of REs comprises:

the user equipment determining the configuration information of the first group of REs according to the interference measurement indicator information; and the user equipment determining the locations of the first group of REs according to the determined configuration information.

9. The method according to claim 8, wherein when the interference measurement indicator information is determined by the network-side apparatus in a bitmap or the interference measurement indicator information is determined by the network-side apparatus according to an index of the first group of REs, before the user equipment determining the locations of a first group of REs, the method further comprises:

the user equipment receiving configuration information of all the groups of REs in a set of groups of REs from the network-side apparatus, wherein the set of groups of REs comprises all the groups of MUTING REs; and when the interference measurement indicator information is determined by the network-side apparatus in a bitmap, the user equipment determining the locations of a first group of REs comprises:

the user equipment determining in the bitmap the first group of REs from all the groups of REs in the set of groups of REs; and the user equipment determining the configuration information of the first group of REs from the received configuration information of all the groups of REs in the set of groups of REs; or when the interference measurement indicator information is determined by the network-side apparatus according to the index of the first group of REs, the user equipment determining the locations of a first group of REs comprises:

the user equipment determining the first group of REs from all the groups of REs in the set of groups of REs according to the index; and the user equipment determining the configuration information of the first group of REs from the received configuration information of all the groups of REs in the set of groups of REs.

10. The method according to claim 8, wherein when the interference measurement indicator information is determined by the network-side apparatus in a bitmap or the interference measurement indicator information is determined by the network-side apparatus according to an index of the first group of REs, the method further comprises:

the user equipment receiving the configuration information of the first group of REs transmitted from the network side.

11. The method according to claim 8, wherein the configuration information of the group of REs includes one or more of:

the number of antenna ports, a pilot pattern, a pilot transmission periodicity, a subframe offset, the number of REs in the group of REs, periodicity and locations in a subframe.

12. A network-side apparatus, comprising a processor onto which computer program instructions are loaded, wherein the processor is configured to execute the computer program instructions to implement:

a configuration information determining module configured to determine configuration information of a first group of REs for interference measurement;

a generating module configured to generate first interference notification information according to the configuration information of the first group of REs; and a transmitting module configured to transmit the first interference notification information to a user equipment to instruct the user equipment to determine the first group of REs according to the first interference notification information and to measure interference on the determined first group of REs by taking received signal on the first group of REs as interference, wherein the generating module is further configured:

to determine interference measurement indicator information corresponding to the configuration information of the first group of REs according to a correspondence relationship between the configuration information and the interference measurement indicator information and to take the determined interference measurement indicator information as the first interference notification information.

13. The network-side apparatus according to claim 12, wherein the interference measurement indicator information is determined by the generating module in a bitmap; or the interference measurement indicator information is determined by the generating module according to the configuration information of the first group of REs; or the interference measurement indicator information is determined by the generating module according to an index of the first group of REs; or the interference measurement indicator information is determined by the generating module according to the configuration information of the first group of REs and a virtual cell identifier corresponding to the first group of REs.

14. The network-side apparatus according to claim 13, wherein when the interference measurement indicator information is determined by the generating module in a bitmap or the interference measurement indicator information is determined by the generating module according to the index of the first group of REs, the processor is further configured to execute the computer program instructions to implement:

a second notifying module configured to transmit configuration information of each group of REs in a set of groups of REs to the user equipment;

wherein the set of groups of REs comprises all the groups of MUTING REs.

15. The network-side apparatus according to claim 13, wherein when the interference measurement indicator information is determined by the generating module in a bitmap or the interference measurement indicator information is determined by the generating module according to the index of the first group of REs, the transmitting module is further configured:

to transmit the configuration information of the first group of REs to the user equipment.

16. The network-side apparatus according to claim 12, wherein the generating module is further configured:

to generate the first interference notification information according to the determined configuration information of the first group of REs upon determining that the user equipment shall measure interference on the first group of REs, wherein the generating module is further configured:

to generate second interference notification information upon determining that it is not necessary for the user equipment to measure interference on the first group of REs; and the transmitting module is further configured:

to transmit the second interference notification information to the user equipment to instruct the user equipment to measure interference according to a CRS and/or a measurement pilot.

17. A user equipment, comprising a processor onto which computer program instructions are loaded, wherein the processor is configured to execute the computer program instructions to implement:

a location determining module configured to determine locations of a first group of REs for interference measurement according to received first interference notification information from a network-side apparatus; and a measuring module configured to measure interference on the determined first group of REs by taking received signal on the first group of REs as interference, wherein the first interference notification information is interference measurement indicator information; and the location determining module is configured:

to determine configuration information of the first group of REs according to the interference measurement indicator information and to determine the locations of the first group of REs according to the determined configuration information.

18. The user equipment according to claim 17, wherein when the interference measurement indicator information is determined by the network-side apparatus in a bitmap, the location determining module is configured:

to receive configuration information of all the groups of REs in a set of groups of REs from the network-side apparatus, to determine the first group of REs from all the groups of REs in the bitmap and to determine the configuration information of the first group of REs from the received configuration information of all the groups of REs in the set of groups of REs; and when the interference measurement indicator information is determined by the network-side apparatus according to an index of the first group of REs, then the location determining module is further configured to receive configuration information of all the groups of REs in a set of groups of REs from the network-side apparatus, to determine the first group of REs from all the groups of REs in the set of groups of REs according to the index and determines the configuration information of the first group of REs from the received configuration information of all the groups of REs in the set of groups of REs; and wherein the set of groups of REs comprises the first group of REs and a second group of REs.

19. The user equipment according to claim 17, wherein when the interference measurement indicator information is determined by the network-side apparatus in a bitmap or the interference measurement indicator information is determined by the network-side apparatus according to an index of the first group of REs; and the location determining module is further configured:

to receive the configuration information of the first group of REs from the network side.

* * * * *